United States Patent [19]
Regan

[11] 3,837,734
[45] Sept. 24, 1974

[54] METHOD OF AND APPARATUS FOR MEASURING VISUAL LATENCY

[75] Inventor: David Regan, Newcastle-under-Lyme, England

[73] Assignee: Wilkinson Sword Limited, London, England

[22] Filed: Feb. 1, 1973

[21] Appl. No.: 328,780

[30] Foreign Application Priority Data
Feb. 2, 1972  Great Britain...................... 4865/72

[52] U.S. Cl..................... 351/17, 250/206, 351/23, 351/31, 351/36, 351/39
[51] Int. Cl............................ A61b 3/02, A61b 3/06
[58] Field of Search............ 351/1, 6, 7, 17, 23, 24, 351/25, 31, 36, 37, 39; 128/2 T; 250/206

[56] References Cited
UNITED STATES PATENTS
3,473,868  10/1969  Young et al....................... 351/1 X OTHER PUBLICATIONS
M. Lichtenstein et al., "Relative Visual Latency . . .," JOSA, Vol. 51, pps. 1,033–1,034, 9-1961.

*Primary Examiner*—Paul A. Sacher
*Attorney, Agent, or Firm*—Wolfe, Hubbard, Leydig, Voit & Osann, Ltd.

[57] ABSTRACT

Visual latency in a human subject is tested by apparatus having a central light source serving as a fixation mark and a second light source movable radially and azimuthally relative thereto. For each position of the second source, the illumination level of the two sources is abruptly altered. The time lag between the instant when the illumination level of one source is altered and the instant when the illumination level of the other source is altered is adjusted until both are perceived by the subject to alter together. This process is repeated for each test. In a modification, both light sources are movable together to different radial and azimuthal positions relative to a fixation mark, and the same type of test is repeated but with polarizing filters over the two sources to ensure that each one is perceived by only one of the subject's eyes.

22 Claims, 8 Drawing Figures

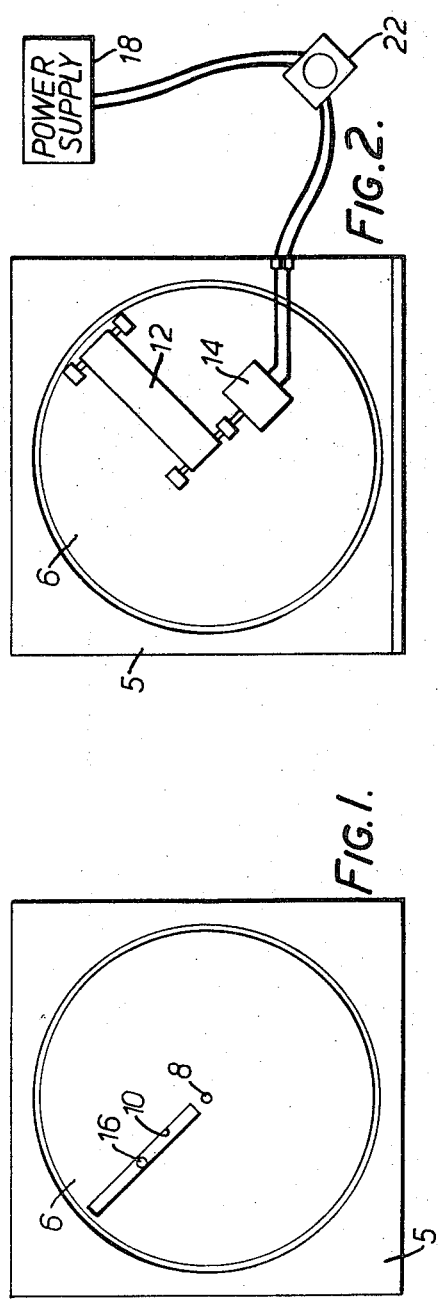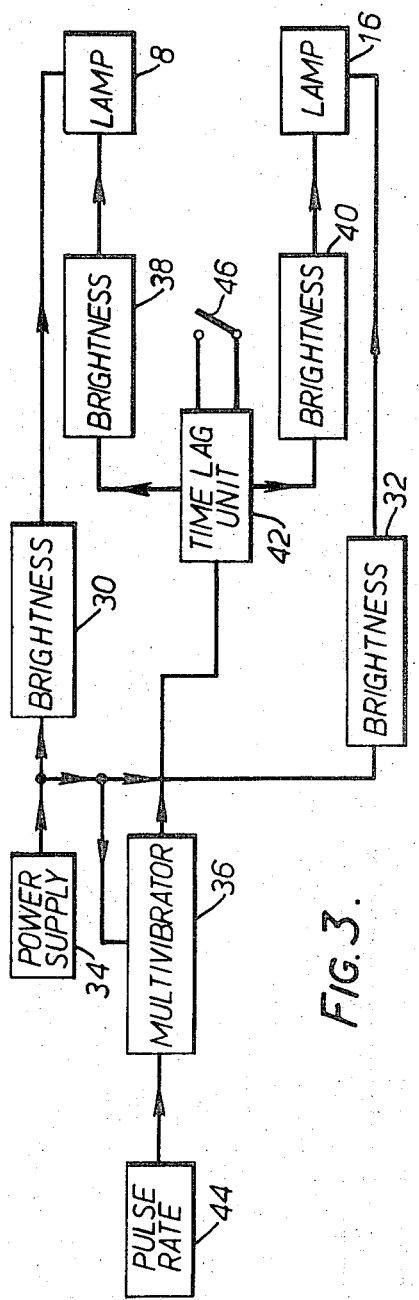

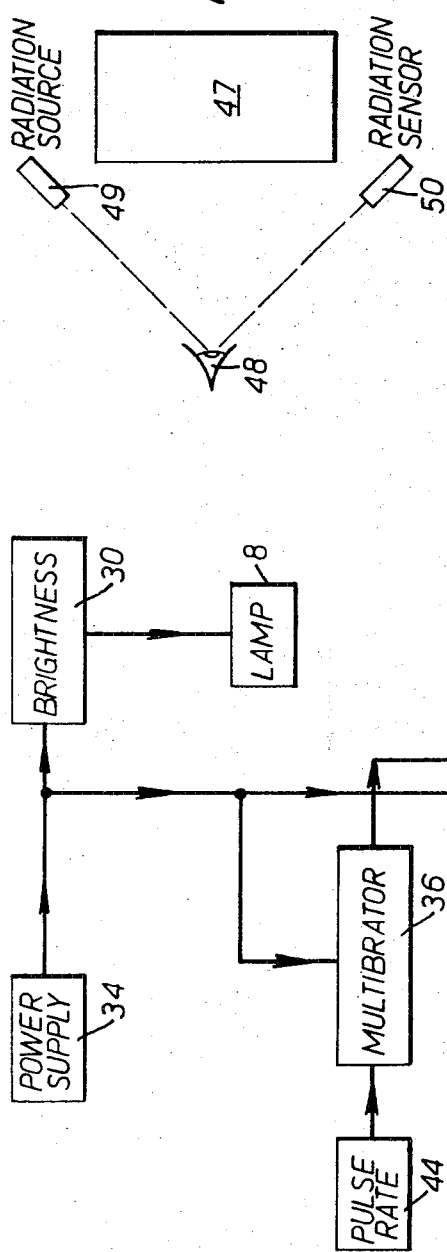

PATENTED SEP 24 1974 3,837,734

METHOD OF AND APPARATUS FOR MEASURING VISUAL LATENCY

The invention relates to vision testing apparatus and methods, and more particularly to apparatus and methods for measuring visual latency in a human subject.

According to the invention, there is provided a method of testing visual latency in a human subject, comprising the steps of presenting at least one discrete light source to the subject, carrying out a series of tests in each of which the level of illumination of the light source is abruptly altered and in each of which the light source appears in a different position in the subject's visual field, and comparing the relative lags in the subject's perception of the alterations in the illumination level in all the tests.

According to the invention, there is further provided a method of testing for visual latency in a human subject, comprising the steps of presenting two discrete light sources in the subject's visual field, carrying out a series of tests in each of which the levels of illumination of the two light sources are abruptly altered, setting, for each test, a time lag (which may be zero) between the instants when the levels of illumination of the two sources are actually altered, and determining whether the levels of illumination of the two sources appear to the subject to alter substantially simultaneously.

According to the invention, there is also provided apparatus for testing visual latency in a human subject, comprising means for supporting at least one discrete light source capable of presenting light towards the subject in his visual field, means for abruptly altering the level of illumination of the light source, means responsive to a movement in the subject's eye under test for sensing the instant when the subject's eye perceives the said alteration in level of illumination, and means for measuring the time lag between the instant when the level of illumination of the light source is actually altered and the instant when the alteration is perceived by the subject's eye.

According to the invention, there is yet further provided apparatus for testing visual latency in a human subject, comprising means for supporting two discrete light sources capable of presenting light towards the subject in his visual field, means for repeatedly and abruptly altering the levels of illumination of the two light sources, and means for setting the time lag (which may be zero) between the instants when the levels of illumination of the two sources are actually altered, whereby to enable the conditions under which the subject sees the levels of illumination as altering substantially simultaneously to be determined.

According to the invention, there is still further provided apparatus for testing for visual latency in a human subject, comprising a support member mounted for angular movement about an axis and for movement radially of the axis, first and second discrete light sources mounted to project light in the same direction parallel to the axis, at least one of the light sources being mounted on the support member for movement therewith to different radial and azimuthal positions, means for abruptly altering the levels of illumination of the two light sources, and means for varying the time lag (which may be zero) between the instants when the levels of illumination of the two sources are actually altered, so as to determine a time lag setting and particular radial and azimuthal positions of the said one light source such that the two sources appear to a subject viewing them in a visual field centred on the said axis to alter substantially simultaneously.

Apparatus for embodying the invention, and methods according to the invention, of measuring visual latency, will now be described, by way of example only, with reference to the accompanying diagrammatic drawings in which:

FIG. 1 is a front view of the apparatus;

FIG. 2 is a rear view of the form of apparatus of FIG. 1;

FIG. 3 is a block circuit diagram of the apparatus;

FIG. 4 is a side view of another form of the apparatus;

FIG. 5 is a schematic circuit diagram of the apparatus of FIG. 4;

Figure 6:
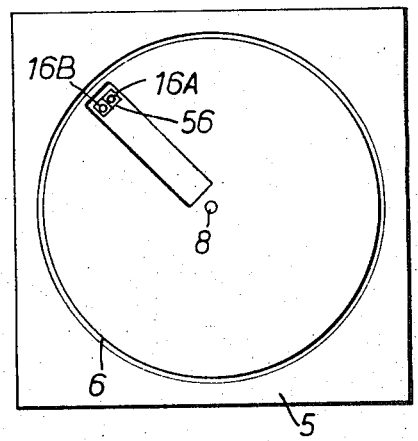
FIG. 6 is a front view of a modified form of the apparatus of FIGS. 1 and 2.

The apparatus and methods to be described can be used to measure the relative visual lag or latency between different points (regions) of the patient's field of vision. The result can be important for investigating lesions where changes in conduction velocity or visual latency are involved. A particularly important area is that of demyelinating diseases, particularly in their optical manifestations. Measurement of visual latency may enable access to changes in transmission time within the visual pathways which are associated with demyelination (for example, in retrobulbar neuritis), and thus enables direct access to the pathology underlying the demyelination. Measurement of visual latency can also give access to demyelination present during the quiescent period in multiple sclerosis, and thus can be used to assess residual demyelination (which may be subclinical) after acute episodes of optic neuritis. It may therefore be of particular value in assessing the underlying pathology in optic neuritis.

The apparatus (FIG. 1) has a cabinet 5 in the front face of which is rotatably mounted a disc 6 which may, for example, be about two feet in diameter and which can be set into any angular position over 360°. At the centre of the disc is mounted a lamp 8 which is preferably of the solid state type.

The disc has a radially extending slot 10, and as shown in FIG. 2, a continuous band 12 is mounted on the rear of the disc so that one of its runs covers the slot 10. An electric motor 14 is connected to one of the rollers, over which the band 12 runs, and can be operated to drive the band in either direction.

The band carries a second lamp 16 (FIG. 1), again preferably of the solid state type.

As shown diagrammatically in FIG. 2 (but omitted from FIG. 1), the motor 14 is energised from a power supply 18 under control of a remote hand-held switch 22. The switch enables the motor to be run in either direction. In this way, the lamp 16 can be moved to any radial position relative to the lamp 8. A position-sensitive servo control system may be provided to enable more accurate positioning of the lamp 16.

FIG. 3 shows a circuit diagram of the apparatus in block form.

The lamps 8 and 16 are respectively connected to brightness control units 30 and 32 which are fed from a power supply 34 and can be individually adjusted to set the illumination of the lamps, this illumination being at a relatively low or background level. In addition, each lamp 8, 16 is fed from a multivibrator unit 36 through respective brightness controls 38 and 40. The lamp 16 is connected to the multivibrator 36 through an adjustable time lag unit 42. A control 44 enables the repetition frequency of the multivibrator 36 to be adjusted. In one particular example of the apparatus, the multivibrator pulse repetition rate could be adjusted from one pulse every half a second to one pulse every 2 seconds, a 50 percent ON/OFF ratio being maintained irrespective of pulse duration. The unit 42 enables the time between the instant when the lamp 8 is energised and the instant when the lamp 16 is energised to be adjusted. In one particular example of the apparatus, this time difference could be adjusted between limits of ÷ 100ms but other ranges of say ± 200ms or ± 350ms may be used in addition or instead.

Thus, in operation the multivibrator 36 causes each lamp to be repetitively pulsed from its low or background level of illumination (set by the control 30 or 32) to a full-on level of illumination. The brightness of the full-on level of illumination is set by means of the respective brightness control 38, 40.

In operation, the disc 6 (FIG. 1) is set to a particular one of twelve (say) angular positions, the brightness controls 30, 32, 38 and 40 are set to desired levels, and a predetermined time lag is set by the control 42. The patient, sitting in front of the disc 6, then fixates his eye on the lamp 8 and, by means of remote hand-held switch 22, radially positions the lamp 16 until he notices no time difference between the on-times of the two lamps. The final position of the lamp 16 along the particular radius represents a corresponding point on the retina of the eye at which a visual delay exists of the order of that set by means of the control unit 42.

The disc 6 is then rotated to the next one of the 12 angular positions, and the test is repeated; and so on for the remaining angular positions.

A different time lag is then set by means of the control unit 42 and tests at the twelve angular positions of the disc and carried out again.

The results obtained can be presented graphically by drawing contours of equal visual lag (latency).

Discontinuities in the graphical representation so produced, and/or abnormalities as compared with a normal response, may be indicative of extra-ordinary delays in transmission time in parts of the optic nerve, possibly resulting from certain demyelinating disorders in the nervous system.

In the mode of operation described above, it is convenient for the two lamps 8 and 16 to be switched off at the same time. The lamps should be switched off for a time sufficiently long to prevent confusion by the patient between his responses to the changes in lamp intensity. In an alternative mode of operation, a switch 46 can be operated so that the control 42 determines the time lag between the switch off-times of the two lamps. In other respects, the test is carried out as described above, with the patient being asked to adjust the radial position of the lamp 16 until the lamps appear to him to switch off simultaneously.

Instead of asking the patient to adjust the radial position of the lamp 16 until he judges the flashes to be simultaneous, he can be asked to adjust the control 42 for simultaneity of perception (with the lamp 16 at a given radial position). However, the mode first described in which the patient is asked to adjust the radial position of the lamp 16 may be advantageous in that the patient is less able to influence readings by his changes in criterion; furthermore, the settings given to the control unit 42 can be randomised so that the patient is unable to anticipate the new radial position of the lamp 16 when the time lag or lead is altered.

A procedure which minimises the effect of the subject's criterion and changes in this criterion (e.g. his desire to never make an error or his tendency to guess) is to instruct him to indicate either (i) the lamp 16 preceded lamp 8 or (ii) the lamp 16 lagged lamp 8. No alternative is allowed. Single shot operation of the lamps is used and the subject responds to each shot. The investigator alters the relative timing unit, for a series of shots at a fixed timing, the subject gives response (i) for 50 percent of the shot and response (ii) for the remaining 50 percent: this timing is then assumed to be that at which the subject sees the two lamps light at the same time. In practice, the subject will give this 50 percent response for a range of timings, and the extent of this range may be of diagnostic relevance: a wide range may be indicative of visual defects.

It may be advantageous to set the control 42 at a particular lag time which has been previously found to be normal for a given radial position of the lamp 16, and then to traverse the lamp 16 radially through this position. This method rapidly reveals a "hole or valley" in the patient's visual field since he suddenly sees a change in the apparent timing of the two lamps.

It is important that the retinal state of adaptation should be held constant during the investigation. To this end, preferably the whole stimulus area should be white matt and illuminated to a low or medium photopic level to which the patient is and remains adapted throughout the test.

In the mode of operation described above, the tests are carried out on a subjective basis in that it is the patient himself who indicates simultaneity of perception of the on or off times of the two lamps. In the modification shown in FIGS. 4 and 5 however, measurement of time of perception by the patient can be carried out objectively.

In FIG. 4, the block 47 indicates generically apparatus of the form shown in FIGS. 1 and 2, with the patient's eye at 48. The circuitry for energising the lamps 8 and 16 is shown in FIG. 5 and is slightly different from that shown in FIG. 3. Items corresponding to those in FIG. 3 are similarly referenced. It will be seen that the lamp 8 is continuously illuminated at a steady level of brightness set by the control 30. Its connection to the multivibrator 36 for periodically altering its level of illumination is removed. The multivibrator 36 only alters the level of illumination of the lamp 16 and the time lag unit 24 is also removed.

In carrying out tests with the apparatus of FIGS. 4 and 5, the patient is not asked to say whether or not the two lamps 8 and 16 are perceived simultaneously — instead, the relative latencies of signals travelling up the optic nerve from different regions of the retina are measured by sensing movement of his eye pupil in response to the stimulating light. To this end, the apparatus of FIG. 4 includes a unit 49 which directs a beam of visible or non-visible radiation (infra-red radiation, for example) on to the boundary of the patient's pupil and iris. The reflected beam from the eye 48 is arranged to fall upon a radiation sensor 50 such as an appropriate photocell. If the edge of the iris moves (that is, indicating a change in pupil size), then the intensity of the radiation reaching the radiation sensor 50 will change and it will emit a corresponding signal. Absolute measurements of change in pupil size are not required.

The changes in pupil diameter will be small and may be masked by noise such as by spontaneous change of pupil position. In order to overcome or reduce this problem, the signal-to-noise ratio is enhanced by feeding the signal of the sensor 50 to a non-adaptive cross correlator 51 (FIG. 5). This correlator also receives a signal on a line 52 at each instant when the lamp 16 is switched on. The correlator 51 operates by suppressing those signals from the sensor 50 which are not systematically related in time to the signals on line 52. The correlator 51 therefore produces output signals on a line 53 each of which can be assumed to be indicative of signals in the optic nerve elicited by a change in illumination level of the lamp 16, and this signal is fed to a time measuring unit 54 which also receives a signal on the line 55 each time there is a change in illumination level of the lamp 16.

In operation, the lamp 16 is given a particular radial and azimuthal position by appropriate setting of the disc 6 and the belt 10 (as shown in FIGS. 1 and 2), and the multivibrator 36 is set to operate at a particular pulse rate. At each instant when lamp 16 is switched on, a signal is fed on line 55 into the timing unit 54. In response to each such change in illumination level of the lamp 16, the patient's pupil will move at the instant when the change in illumination level is sensed. As explained above, this change in movement is sensed by the unit 50 and produces a corresponding signal on line 53 which is also fed to the timing unit 54. The timing unit 54 measures the time lag between each signal on the line 53 and the preceding signal on the line 55, and thus gives a direct measurement of visual latency.

The lamp 16 is then moved to different radial and azimuthal settings and similar tests carried out.

With the apparatus of FIGS. 4 and 5, the lamp 8 is only used to help maintain eye fixation.

In a modification of the apparatus of FIGS. 4 and 5, the light from the lamp 16 can be flickered or chopped in brightness in a predetermined manner, and the output of the sensor 50 can then be Fourier-analysed at one or more harmonics, and the phase lag of this response can either be plotted against frequency of stimulation for each position of the lamp 16, or, alternatively, the phase lag of this response can be plotted against the radial position of the lamp 16 as it is tracked through an area of interest. Either method can be used offline by recording both the timing signals and the output of the radiation sensor on magnetic tape, for example.

Figure 7:
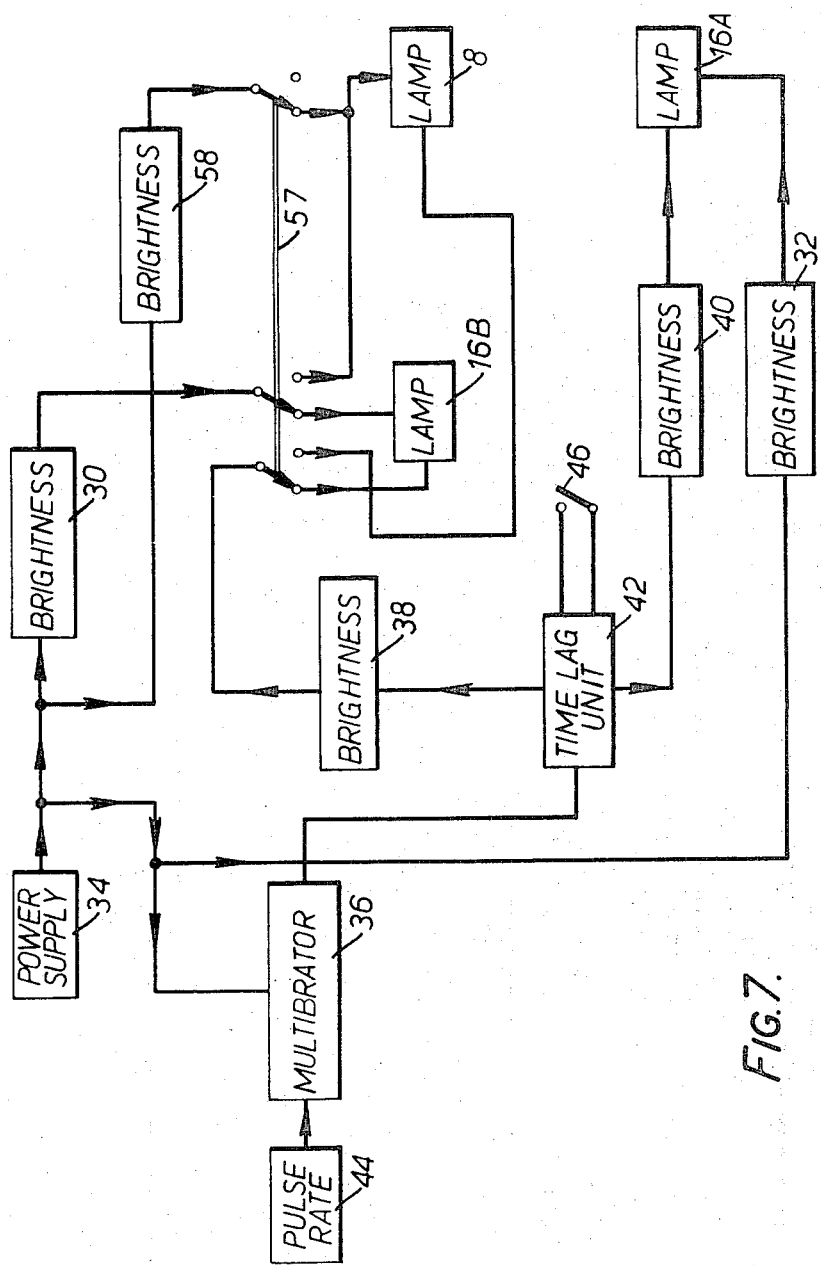
FIG. 7 is a block circuit diagram of the apparatus of FIG. 4.

FIGS. 6 and 7 show a modified form of the apparatus for directly comparing the two eyes.

FIG. 6 is a front view corresponding to that of FIG. 1 (the rear view being the same as that shown in FIG. 2) and shows that the belt 10 carries two lamps, 16A and 16B, which are mounted very close together, and move as a pair with the belt. As before, the lamp 8 is stationary in the middle of the disc 6. Polarising filters 56 are mounted over the lamps 16A and 16B and perpendicularly polarise the light which they respectively emit. The subject is provided with corresponding polarising filters for his two eyes, so arranged that one eye can only see the light emitted by the lamp 16A while the other eye can only see the light emitted by the lamp 16B.

The circuitry of FIG. 7 is similar to the circuitry of FIG. 3 except for the provision of a three pole switch 57 and an extra brightness control 58 energised from the power supply 34. When the switch 57 is in its right hand setting (as viewed in FIG. 7), the lamp 16B is disconnected from the circuitry and the lamp 8 is connected, the brightness cotrol 58 being inoperative. The circuitry is thus in exactly the same form as that shown in FIG. 3 and, with the polarising filter 56 removed, the lamp 8 and the lamp 16A can be used to carry out the tests described with reference to FIGS. 1 to 3. These tests assess the performance of only one of the subject's eyes at a time and he does not of course wear the polarising filters.

However, when the switch 57 is in its left hand position, lamp 16B is connected to be energised from the brightness controls 30 and 38 instead of the lamp 8. At the same time, the lamp 8 is connected to be energised directly from the brightness control 58. In this setting of the switch 57, the apparatus is set up for testing both eyes simultaneously in a manner to be described, and the polarising filters 56, and the corresponding filters worn by the subject, are in position. The brightness control 58 is set to give a constant level of brightness for the lamp 8 which acts purely as a fixation assistor.

With the switch 57 in its left hand setting, adjustment of the control 42 alters the lag between the on-time of the lamps 16A and 16B. As described with reference to FIG. 3, the brightness controls 30 and 32 determine the basic levels of illumination of the lamps 16A and 16B while the brightness controls 38 and 40 determine the increased levels of illumination to which the lamps are switched by each pulse from the multivibrator 36.

In performing a series of tests on a subject, the control 22 (FIG. 2) is adjusted to set the belt 10 in a particular radial position so as to position the lamps 16A and 16B accordingly. The control 42 is then adjusted until the subject sees the two lamps 16A and 16B as switching on simultaneously. Clearly, if both the subject's eyes have equal visual lag or latency, then he will see both lamps 16A and 16B switching on simultaneously when the control 42 is giving no actual lag between the two lamps. If, however, there is a difference between the visual lag of his two eyes, then he will see the lamps switching on simultaneously when the control 42 is giving an actual lag. A difference in the visual lag or latency between the subject's two eyes may be indicative of visual defects, possibly resulting from certain demyelinating disorders in the nervous system.

After completing the test at one radial position of the lamps 16A and 16B, the control 22 is used to set the lamps in a different radial position, and the test is repeated. In this way, a series of tests at different radial positions is carried out and then the tests are repeated at different azimuthal settings of the disc 6. When the azimuth of the lamps is changed, the angles of the polarisers in front of the lamps with respect to the polarisers in front of the subject's eyes should also be changed, unless steps are taken to retain the polarisation of the light in a fixed plane, such as by using a weighted end.

The subject's assessment of simultaneity is assisted by the closeness of the two lamps 16A and 16B. Because of the closeness of the lamps, the light is seen to move from the lamp appearing to switch on first to the lamp appearing to switch on second: thus, when the subject sees no such movement of light, then this is indicative of simultaneity.

The lamps 16A and 16B can be arranged to produce light of different colour. For example, both lights may be green or red. Latency differences between the two eyes or between different parts of the same eye may be more marked for some colours then for other colours and this may be of clinical significance.

An alternative method of directly comparing the two eyes is to place polarising filters over lamps 8 and 16 of FIG. 1 or lamps 8 and 16A of FIG. 6. As before, the subject views the lamps through a second pair of polarising filters, so oriented to ensure that one eye is stimulated by one lamp only and the other eye is stimulated by the other lamp only. In one version of the method both eyes view a marker in front of the polarising sheet which covers lamp 8. Either the position or the timing of lamp 16 (or 16A) is then altered until the two lamps appear to change illumination level simultaneously. In this way the latency difference is determined between the fovea of one eye and a number of retinal positions of the other eye. For each azimuth, the angle of the polarisers in front of the subject's eyes must be adjusted to maintain the situation that one eye is stimulated by one lamp only, and the other eye is stimulated only by the other lamp.

Figure 8:
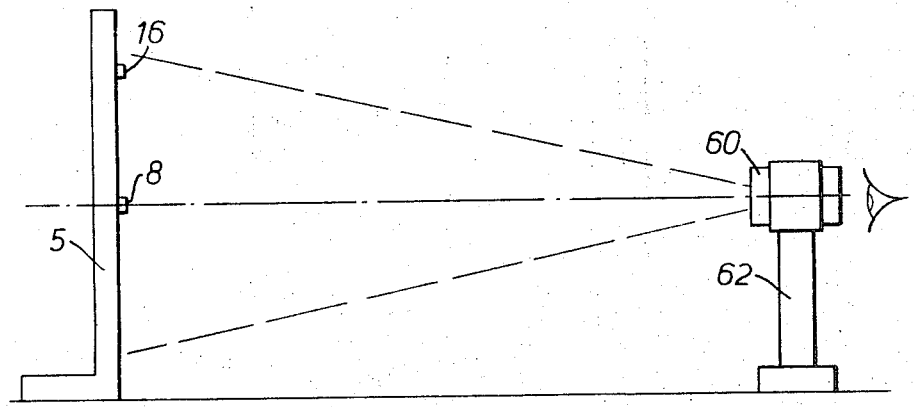
FIG. 8 shows a modified form of the apparatus of FIGS. 1 and 2 in side view.

In a further modification, the rotatable disc 6 would be replaced by a fixed disc with the lamp 16 held in a predetermined azimuthal position relative to the lamp 8. The lamp 16 would then be viewed by the patient through a rotatably mounted dove prism. Rotation of the dove prism would move the image of the lamp 16, as viewed by the patient, to different azimuthal positions. It would be necessary to ensure that the rotation of the prism did not move the image of the lamp 8. Only one eye views through the dove prism. FIG. 8 shows a side view of the modified form of the apparatus in side view with the dove prism 60 rotatably supported on a stand 62. As before, the lamp 16 would be adjustable to different radial distances from the lamp 8 by means of the band 12.

The apparatus described with reference to FIGS. 6 and 7 could also be modified to dispense with the rotatable disc 6 so as to retain the lamps 16A and 16B in a fixed azimuthal position (but adjustable radial distance) relative to the lamp 8. In such a case, two dove prisms would be necessary, one in front of each eye, in order to align the two lamps 16A and 16B at any required azimuth.

What is claimed is:

1. A method of testing visual latency in a human subject, comprising the steps of
   presenting a fixation point in the subject's visual field,
   presenting at least one discrete light source to the subject such that said source appears in the subject's visual field and displaced relative to said fixation point in the subject's visual field,
   carrying out a series of test, each of said tests including the step of abruptly altering the level of illumination of the light source at an initial predetermined position in the subject's visual field, and then moving the light source to a different position in the subject's visual field preparatory to the next said test, and
   comparing the relative lags in the subject's pupillary response to the alterations in the illumination level in all the tests.

2. A method according to claim 1, including, for each test, the step of sensing the instant when the alteration in the illumination level of the source is perceived by the subject whereby to assess the lag in the subject's perception pertaining to that test.

3. A method of testing visual latency in a human subject, comprising the steps of
   presenting a fixation point for the subject's visual field,
   presenting first and second discrete light sources to the subject in the subject's visual field, at least one of which is displaced relative to the fixation point,
   carrying out a series of tests, each of said tests including the step of abruptly altering the levels of illumination of the two light sources and then moving the first light source to a different position relative to the fixation point in the subject's visual field preparatory to the next said test, but holding the second light source at a substantially fixed position relative to the fixation point within the subject's visual field during the series of tests, and
   for each test, setting a time lag between the instants when the levels of illumination of the two light sources are respectively altered whereby to obtain for each test a time lag and relative positional setting of the two light sources such that the subject perceives their illumination levels as altering substantially simultaneously thereby producing an assessment of the relative lag in the subject's perception for that test.

4. A method according to claim 3, including the step of controlling the light outputs of the two sources such that one light source can only be perceived by one eye and the other can only be perceived by the other eye.

5. A method of testing visual latency in a human subject comprising the steps of
   presenting a fixation point for the subject's visual field,
   presenting first and second discrete light sources to the subject, and in the subject's visual field, and maintaining the two light sources in continual close proximity to each other,
   carrying out a series of tests, each of said tests including the step of abruptly altering the levels of illumination of the two light sources and then moving the two light sources together to a different position relative to the fixation point in the subject's visual field preparatory to the next said test,
   controlling the light outputs of the two light sources such that one light source can only be perceived by one eye and the other can only be perceived by the other eye, and
   for each test, setting a time lag between the instants when the levels of illumination of the two light sources are respectively altered whereby to obtain for each test a time lag and positional setting of the two light sources in the patient's visual field such that the subject perceives their illumination levels as altering substantially simultaneously, thereby producing an assessment of the relative lag in the subject's visual perception for that test.

6. A method of testing for visual latency in a human subject, comprising the steps of presenting a fixation point for the subject's visual field, presenting two discrete light sources in the subject's visual field, at least one of which is displaced relative to the fixation point, carrying out a series of tests, each of said tests including the step of abruptly altering the levels of illumination of the two light sources, setting, for each test, a time lag between the instants when the levels of illumination of the two sources are actually altered, and determining whether the levels of illumination of the two sources appear to the subject to alter substantially simultaneously.

7. A method according to claim 6, including the step of changing the position of at least one of the sources, relative to the visual field, for each said test.

8. A method according to claim 7, including the steps of holding one of the said sources in a fixed position relative to the visual field, and moving the other said source into respectively different predetermined positions in the visual field for carrying out the series of tests.

9. A method according to claim 8, in which the step of abruptly altering the levels of illumination of the two light sources comprises the step of abruptly altering the level of each source with respect to a predetermined minimum level of illumination which is sensible by the subject, whereby the said first source acts as said fixation point for defining the centre of the subject's visual field.

10. A method according to claim 7, including the step of moving the two light sources together, without altering their relative position, to respectively different predetermined positions relative to the fixation point in the visual field for carrying out the said series of test.

11. A method according to claim 8 for comparison of any difference in the visual latency of the subject's eyes, including the step of blocking the light path between one source and one of the subject's eyes and blocking the light path between the other light source and the other of the subject's eyes, whereby the light from each of the light sources is sensible by a respective one, only of the subject's eyes.

12. A method according to claim 10, for comparison of any difference in the visual latency of the subject's eyes, including the step of blocking the light path between one source and one of the subject's eyes and blocking the light path between the other light source and the other of the subject's eyes, whereby the light from each of the light sources is sensible by a respective one, only of the subject's eyes.

13. Apparatus for testing visual latency in a human subject, comprising means defining a fixation point in the subject's visual field, means for supporting at least one discrete light source spaced from said fixation point and capable of presenting light towards the subject in his visual field, means for abruptly altering the level of illumination of the light source, means responsive to a pupillary movement in the subject's eye under test for sensing the instant when the subject's eye reacts to the said alteration in level of illumination, and means for measuring the time lag between the instant when the level of illumination of the light source is actually altered and the instant when the subject's eye reacts to the alteration.

14. Apparatus according to claim 12, in which the means for sensing the said pupillary movement comprises means for directing a beam of radiation on to the subject's eye, and means for sensing the said radiation as reflected from the subject's eye.

15. Apparatus according to claim 13, in which the said light source is an electrically illuminatable light source and in which the means for sensing the reflected radiation is a radiation transducer producing an electrical output, and including correlating means connected to receive signals from the radiation transducer and signals produced simultaneously with the actual alterations in illumination level of the light source, whereby to tend to suppress signals from the radiation transducer due to noise.

16. Apparatus for testing visual latency in a human subject, comprising means defining a fixation point in the subject's visual field, support means for supporting two discrete light sources both positioned to present light towards the subject in his visual field, and at least one of which is displaced relative to the fixation point, means for repeatedly and abruptly altering the levels of illumination of the two light sources, and means for setting the time lag between the instants when the levels of illumination of the two sources are actually altered, whereby to enable the conditions under which the subject sees the levels of illumination as altering substantially simultaneously to be determined.

17. Apparatus according to claim 15, including positioning means for altering the apparent position in the subject's visual field of at least one of the light sources.

18. Apparatus according to claim 16, in which both of the said light sources are mounted closely adjacent each other and positioning means for altering the position of the two light sources relative to the fixation point.

19. Apparatus according to claim 16, in which the positioning means includes dove prism means, means for rotatably supporting the dove prism means so that at least the said one light source is viewed through the dove prism means by the subject, and means for rotating the dove prism means to adjust the azimuth of the said one light source in the subject's visual field.

20. Apparatus according to claim 15, in which the support means comprises a support member, and a base mounting the support member for angular movement about an axis and for movement radially of the axis, at least one of the light sources being mounted on the support member for movement therewith to different radial and azimuthal positions.

21. Apparatus according to claim 15, including means for differentially characterising the light emitted by the two sources whereby to enable the light from one of these sources to be blocked from one of the subject's eyes and the light from the other of these sources to be blocked from the other of the subject's eyes.

22. Apparatus according to claim 15, in which the said two light sources are two of three light sources all of which are electrically energisable, one of the three light sources being the means defining the fixation point of the subject's visual field in use and the others being mounted for movement as a pair and relative to the said one defining the fixation point of the subject's visual field, the means for abruptly altering the levels of illumination of the two light sources comprises means for electrically pulsing any two of the three light sources, the means for setting the said time lag comprises an energisable time delay circuit through which the energisation pulses are applied to one of the said two light sources, switch means are provided for selecting any two of the three light sources and connecting them to receive the said pulses, and means are positioned in front of the selected two light sources for differentially characterising their light outputs whereby to enable the light output of one source to be perceived by only one eye of the subject and to enable the light output of the other source to be perceived by only the other eye of the subject.

* * * * *